US012602249B2

(12) United States Patent　　　　(10) Patent No.: US 12,602,249 B2
Earl et al.　　　　　　　　　　　　(45) Date of Patent: *Apr. 14, 2026

(54) HARDWARE RESOURCE ALLOCATION SYSTEM FOR ALLOCATING RESOURCES TO THREADS

(71) Applicant: Apple Inc., Cupertino, CA (US)

(72) Inventors: Mark D. Earl, Oviedo, FL (US); Dimitri Tan, Austin, TX (US); Christopher L. Spencer, Chuluota, FL (US); Jeffrey T. Brady, Orlando, FL (US); Ralph C. Taylor, Orlando, FL (US); Terence M. Potter, Austin, TX (US)

( * ) Notice: Subject to any disclaimer, the term of this patent is extended or adjusted under 35 U.S.C. 154(b) by 821 days.

This patent is subject to a terminal disclaimer.

(21) Appl. No.: 17/240,406

(22) Filed: Apr. 26, 2021

(65) Prior Publication Data

US 2021/0248006 A1　　Aug. 12, 2021

Related U.S. Application Data

(63) Continuation of application No. 15/669,445, filed on Aug. 4, 2017, now Pat. No. 10,990,445.

(51) Int. Cl.
　　*G06F 9/50*　　　　(2006.01)
　　*G06F 9/38*　　　　(2018.01)
(52) U.S. Cl.
　　CPC ............. *G06F 9/5005* (2013.01); *G06F 9/38* (2013.01)
(58) Field of Classification Search
　　None
　　See application file for complete search history.

(56) References Cited

U.S. PATENT DOCUMENTS

| | | | |
|---|---|---|---|
| 4,435,753 A | 3/1984 | Rizzi | |
| 6,529,201 B1 * | 3/2003 | Ault | G06T 15/04 |
| | | | 345/582 |
| 6,738,974 B1 | 5/2004 | Nageswaran et al. | |
| 7,248,603 B1 | 7/2007 | Grunkemeyer et al. | |
| 7,752,623 B1 | 7/2010 | Crawford, Jr. | |
| 8,291,426 B2 | 10/2012 | Gustafsson et al. | |

(Continued)

*Primary Examiner* — Aimee Li
*Assistant Examiner* — Zujia Xu
(74) *Attorney, Agent, or Firm* — Kowert, Hood, Munyon, Rankin & Goetzel, P.C.; Mark D. Seegers; Dean M. Munyon

(57)　　　　　　ABSTRACT

In various embodiments, a resource allocation management circuit may allocate a plurality of different types of hardware resources (e.g., different types of registers) to a plurality of threads. The different types of hardware resources may correspond to a plurality of hardware resource allocation circuits. The resource allocation management circuit may track allocation of the hardware resources to the threads using state identification values of the threads. In response to determining that fewer than a respective requested number of one or more types of the hardware resources are available, the resource allocation management circuit may identify one or more threads for deallocation. As a result, the hardware resource allocation system may allocate hardware resources to threads more efficiently (e.g., may deallocate hardware resources allocated to fewer threads), as compared to a hardware resource allocation system that does not track allocation of hardware resources to threads using state identification values.

20 Claims, 7 Drawing Sheets

(56) References Cited

U.S. PATENT DOCUMENTS

| | | | | |
|---|---|---|---|---|
| 9,032,158 | B2 | 5/2015 | Ross | |
| 9,152,510 | B2 | 10/2015 | Busaba et al. | |
| 9,569,360 | B2 | 2/2017 | Vijayrao et al. | |
| 10,049,035 | B1* | 8/2018 | Kulkarni | G06F 12/0223 |
| 2005/0235288 | A1* | 10/2005 | Yamakabe | G06F 9/5072 |
| | | | | 718/100 |
| 2008/0022016 | A1 | 1/2008 | Tripathi et al. | |
| 2009/0100489 | A1* | 4/2009 | Strothmann | H04N 5/76 |
| | | | | 725/114 |
| 2011/0113220 | A1* | 5/2011 | Morishita | G06F 9/3885 |
| | | | | 712/30 |
| 2014/0089734 | A1 | 3/2014 | Busaba et al. | |
| 2014/0282589 | A1 | 9/2014 | Kuang et al. | |
| 2015/0334403 | A1* | 11/2015 | Smithers | G06T 1/60 |
| | | | | 345/555 |
| 2017/0031622 | A1* | 2/2017 | Nagarajan | G06F 3/0607 |
| 2017/0357531 | A1 | 12/2017 | Zhang et al. | |
| 2018/0024862 | A1 | 1/2018 | Nakagawa et al. | |
| 2018/0063145 | A1* | 3/2018 | Cayton | G06F 16/9535 |
| 2019/0155548 | A1* | 5/2019 | Jia | G06F 9/5005 |

* cited by examiner

*Hardware Resource Allocation Circuit 300*

Allocation Request 218

Allocation Response 220

Deallocation Request 222

Deallocation Response 224

Resource Allocation Circuit
208a

Allocation Information Request 310

Allocation Information Response 312

Resource Memory Device
302

Resource Allocation Map
304

Thread Execution Request 314

Thread Execution Response 316

Hardware Resource
306

*500*

Receiving a request to allocate, for a first thread, respective particular numbers of different types of hardware resources
*502*

Determining that fewer than a requested number of one or more types of the hardware resources are available
*504*

Identifying a second thread for deallocation
*506*

Sending deallocation requests to one or more of a plurality of hardware resource management circuits, where the deallocation requests include a state identification value of the second thread
*508*

Sending allocation requests to one or more of the plurality of hardware resource management circuits, where the allocation requests include a state identification value of the first thread and a respective number of requested hardware resources
*510*

Indicating that execution of the first thread has been approved
*512*

*FIG. 5*

HARDWARE RESOURCE ALLOCATION SYSTEM FOR ALLOCATING RESOURCES TO THREADS

PRIORITY CLAIM

The present application is a continuation of U.S. application Ser. No. 15/669,445, filed Aug. 4, 2017 (now U.S. Pat. No. 10,990,445), which is incorporated by reference herein in its entirety.

BACKGROUND

Technical Field

This disclosure relates generally to a hardware resource allocation system.

Description of the Related Art

One goal for managing hardware resources of computing devices (e.g., graphics processing units (GPUs)) is utilizing as much of the computing device as much of the time as possible. One way a utilization of hardware resources may be increased is by simultaneously executing multiple processes in parallel and dynamically allocating the hardware resources between the processes. However, managing such allocation may be difficult, as the processes may, at times, collectively request more hardware resources than are currently available.

SUMMARY

In various embodiments, a hardware resource allocation system is disclosed where a resource allocation management circuit manages allocation requests to allocate a plurality of different types of hardware resources (e.g., different types of registers) to a plurality of threads. In particular, the resource allocation management circuit may track allocation of the hardware resources to the threads using state identification values of the threads. Further, the resource allocation management circuit may send allocation requests to hardware resource allocation circuits corresponding to the hardware resources. In response to determining that fewer than a respective requested number of one or more types of the hardware resources are available, the resource allocation management circuit may identify one or more threads for deallocation. Additionally, the resource allocation management circuit may send deallocation requests to the hardware resource allocation circuits. As a result, the hardware resource allocation system may allocate hardware resources to threads more efficiently (e.g., may deallocate hardware resources allocated to fewer threads), as compared to a hardware resource allocation system that does not track allocation of hardware resources to threads using state identification values. Further, because hardware resources associated with fewer threads may be deallocated, memory bandwidth associated with transferring state information associated with the plurality of threads may also be reduced.

BRIEF DESCRIPTION OF THE DRAWINGS

FIG. 5 is a flow diagram illustrating one embodiment of a method of allocating hardware resources using a hardware resource allocation system.

Figure 1:
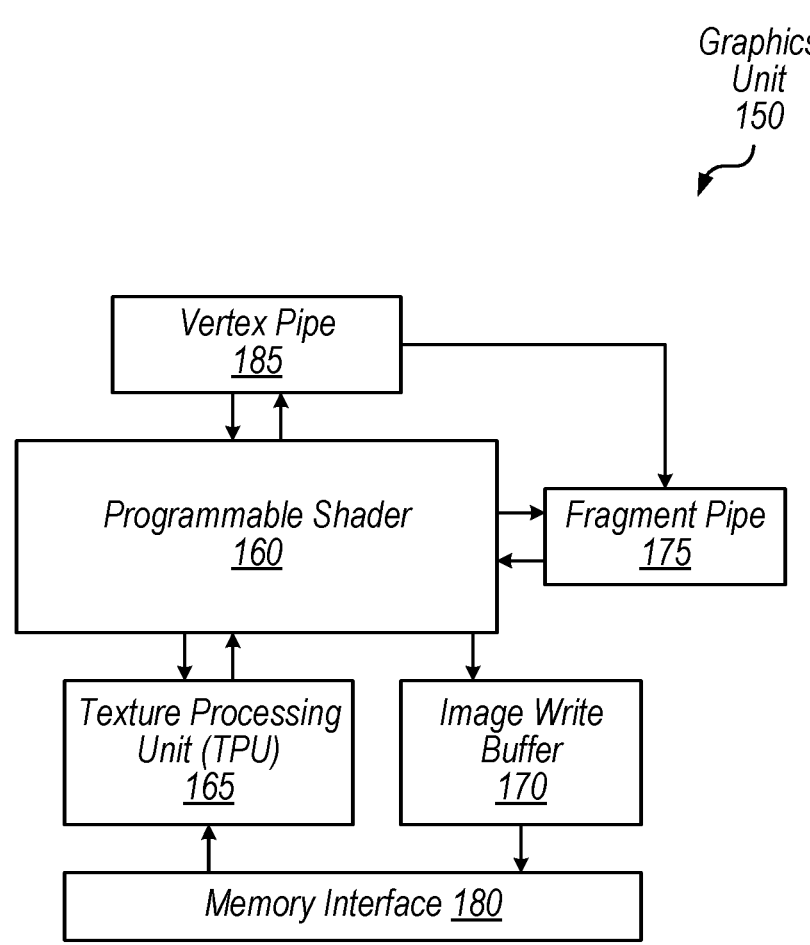
FIG. 1 is a block diagram illustrating one embodiment of a graphics processing unit that includes a hardware resource allocation system.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit) More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a processing circuit that includes six hardware resource allocation circuits, the terms "first hardware resource allocation circuit" and "second hardware resource allocation circuit" can be used to refer to any two of the six hardware resource allocation circuits, and not, for example, just logical hardware resource allocation circuits 0 and 1.

When used in the claims, the term "or" is used as an inclusive or and not as an exclusive or. For example, the phrase "at least one of x, y, or z" means any one of x, y, and z, as well as any combination thereof (e.g., x and y, but not z).

In the following description, numerous specific details are set forth to provide a thorough understanding of the disclosed embodiments. One having ordinary skill in the art, however, should recognize that aspects of disclosed embodiments might be practiced without these specific details. In some instances, well-known circuits, structures, signals, computer program instruction, and techniques have not been shown in detail to avoid obscuring the disclosed embodiments.

DETAILED DESCRIPTION

A hardware resource allocation system is disclosed herein that allocates hardware resources to a plurality of threads. When the resources are allocated, state information associated with the threads may be fetched (e.g., prefetched) and stored at the hardware resources. In some embodiments, the threads may be received from multiple instruction pipelines and may independently request hardware resources. As a result, in some cases, the threads may collectively request more hardware resources than are currently available. Further, deallocating resources associated with threads having inactive execution states, may, in some cases, cause the state information to be fetched again and stored at the hardware resources again (e.g., when the threads no longer have the inactive execution states). This process may consume memory bandwidth.

In some embodiments, the hardware resource allocation system may track the allocations by assigning state identification values to the threads. The hardware resource allocation system may select, based on the state identification values, hardware resources allocated to one or more threads for deallocation (e.g., one or more threads having an inactive execution state). In some embodiments, because the one or more threads are tracked using state identification values, the hardware resource allocation system may deallocate hardware resources associated with fewer threads, as compared to a hardware resource allocation system that does not track allocations using state identification values. Additionally, less memory bandwidth may be consumed, as compared to a hardware resource allocation system that does not track allocations using state identification values.

Situations are described herein where execution of instructions of a thread causes an execution unit to request allocation of hardware resources to the thread. Additionally, situations are described herein where an execution unit requests allocation of hardware resources to a thread on behalf of a thread (e.g., prior to execution of instructions of the thread). For convenience, both cases are intended to be covered by the phrase "a particular thread requests hardware resources" and the phrase "a resource allocation request for a particular thread."

As used herein, the phrase "inactive execution state" is intended to cover situations where a thread is waiting for an event external to the thread. For example, a thread waiting for results of execution of another thread or a thread waiting for data to be provided from an external device (e.g., an external memory device) would be considered to have an inactive execution state. As another example, a thread waiting to be scheduled by an execution unit would be considered to have an inactive execution state.

Turning now to FIG. 1, a simplified block diagram illustrating one embodiment of a graphics unit 150 is shown. In the illustrated embodiment, graphics unit 150 includes programmable shader 160, vertex pipe 185, fragment pipe 175, texture processing unit (TPU) 165, image write buffer 170, and memory interface 180. In some embodiments, graphics unit 150 is configured to process both vertex and fragment data using programmable shader 160, which may be configured to process data (e.g., graphics data) in parallel using multiple execution pipelines or instances. In the illustrated embodiment, the multiple execution pipelines may include multiple types of hardware resources that may be allocated to threads corresponding to multiple data masters. For example, in some embodiments, fragment pipe 175 may include a pixel data master and a vertex data master and programmable shader 160 may include a compute data master. However, in other embodiments, various data masters may be located in other devices.

Vertex pipe 185, in the illustrated embodiment, may include various fixed-function hardware configured to process vertex data. Vertex pipe 185 may be configured to communicate with programmable shader 160 to coordinate vertex processing. In the illustrated embodiment, vertex pipe 185 is configured to send processed data to fragment pipe 175 and/or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 and/or programmable shader 160 to generate fragment data. Vertex pipe 185 and/or fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and/or TPU 165. Programmable shader 160 may be configured to perform vertex processing tasks on vertex data which may include various transformations and/or adjustments of vertex data. Programmable shader 160, in the illustrated embodiment, is also configured to perform fragment processing tasks on pixel data such as texturing and shading, for example. Programmable shader 160 may include multiple execution instances for processing data in parallel. In some embodiments, hardware of programmable shader 160 may be hardware resources that are allocated to various threads.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write buffer 170, in the illustrated embodiment, is configured to store processed tiles of an image and may perform final operations to a rendered image before it is transferred to a frame buffer (e.g., in a system memory via memory interface 180). Memory interface 180 may facilitate communications with one or more of various memory hierarchies in various embodiments.

In various embodiments, a programmable shader such as programmable shader 160 may be coupled in any of various appropriate configurations to other programmable and/or fixed-function elements in a graphics unit. The embodiment of FIG. 1 shows one possible configuration of a graphics unit 150 for illustrative purposes.

Figure 2:
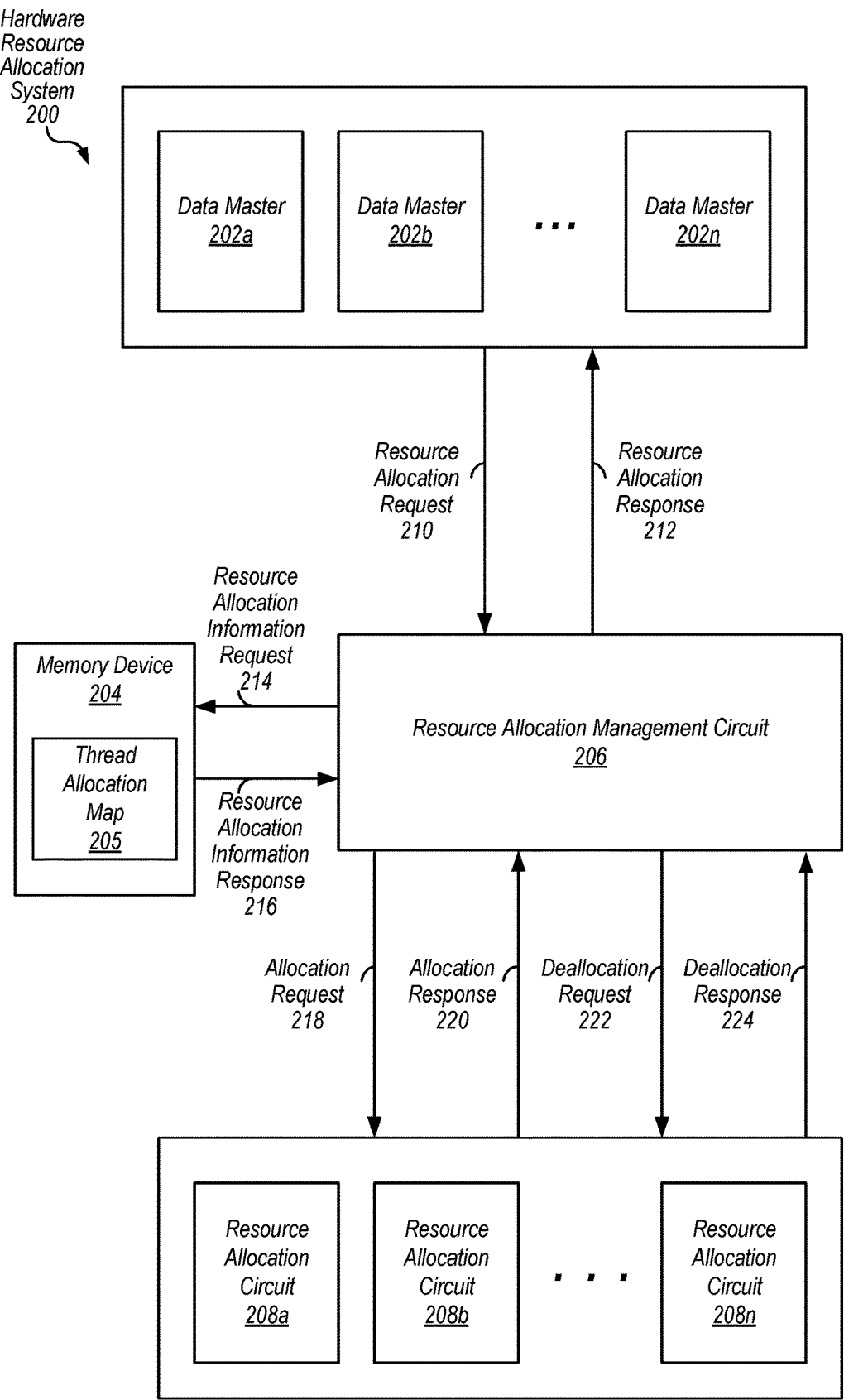
FIG. 2 is a block diagram illustrating one embodiment of an exemplary hardware resource allocation system.

Turning now to FIG. 2, a simplified block diagram illustrating one embodiment of a hardware resource allocation system 200 is shown. In the illustrated embodiment, hardware resource allocation system 200 includes data masters 202a-n, memory device 204, resource allocation management circuit 206, and resource allocation circuits 208a-n. Memory device 204 includes thread allocation map 205. For clarity, in FIG. 2, data masters 202a-n are grouped and signals to and from data masters 202a-n (e.g., resource allocation request 210 and resource allocation response 212) are shown once. However, any of data masters 202a-n may send and receive the signals. Similarly, for clarity, in FIG. 2, resource allocation circuits 208a-n are grouped and signals to and from resource allocation circuits 208a-n (e.g., allocation request 218, allocation response 220, deallocation request 222, and deallocation response 224) are shown once. However, any of resource allocation circuits 208a-n may send and receive the signals. In some embodiments, hardware resource allocation system 200 may correspond to programmable shader 160 of FIG. 1.

Data masters 202a-n may manage execution of a plurality of threads. For example, data masters 202a-n may queue respective threads and may trigger execution of the threads. In various embodiments, data masters 202a-n may send resource allocation requests for corresponding threads, requesting allocation of hardware resources to the threads. For example, data master 202b may send resource allocation request 210 to resource allocation management circuit 206, requesting allocation of various hardware resources to a particular thread managed by data master 202b. Resource allocation request 210 may identify one type of hardware resources or multiple types of hardware resources. In some embodiments, resource allocation request 210 may include a state identification value for the thread (e.g., in cases where the state identification value was previously assigned to the thread). In response to resource allocation request 210, the corresponding data master (e.g., data master 202b) may receive resource allocation response 212. Resource allocation response 212 may indicate whether the requested hardware resources have been allocated. Further, in some embodiments, resource allocation response 212 may include the state identification value for the thread. However, in other embodiments, no state identification value is received at data masters 202a-n.

In the illustrated embodiment, resource allocation request 210 may be sent prior to execution of a corresponding thread (e.g., prefetching hardware resources to be used by the corresponding thread). In other embodiments, resource allocation request 210 may be sent after execution of the corresponding thread has started. Data masters 202a-n may include or may be part of respective instruction pipelines. The instruction pipelines may correspond to different applications. For example, data master 202a may be a pixel data master, data master 202b may be a compute data master, and data master 202n may be a vertex data master. In some embodiments, data masters 202a-n may send a resource allocation request for a second thread prior to completion of execution of a first thread corresponding to that data master.

Resource allocation management circuit 206 may manage allocation of different types of hardware resources to the threads of data masters 202a-n. In particular, resource allocation management circuit 206 may receive resource allocation requests (e.g., resource allocation request 210) from data masters 202a-n and may request (e.g., via allocation request 218) allocation of hardware resources corresponding to resource allocation circuits 208a-n. In some embodiments, resource allocation management circuit 206 may prioritize resource allocation requests from some data masters (e.g., data master 202a) over resource allocation requests from other data masters (e.g., data master 202b) according to an arbitration scheme. Additionally, resource allocation management circuit 206 may generate state identification values corresponding to the threads. As a result, resource allocation management circuit 206 may track, based on the respective state identification values, collective hardware resource allocation for each thread. Accordingly, in some embodiments, hardware resource allocation system 200 may track allocation of different types of hardware resources to different threads from different data masters. In some embodiments, resource allocation management circuit 206 may reserve respective numbers of different types of hardware resources for allocation requests received from a particular data master (e.g., data master 202b). The respective numbers may be the same or may be different. As a result, in some cases, resource allocation management circuit 206 may decrease a likelihood that a thread of data master 202b may be unable to make execution progress (e.g., due to a deadlock). In some embodiments, resource allocation management circuit 206 may limit threads to respective maximum amounts of allocated resources. The respective maximum amounts may correspond to data masters corresponding to the threads.

In some embodiments, resource allocation management circuit 206 may track whether various threads respectively have active execution states. For example, based on resource allocation management circuit 206 granting a resource allocation request 210, resource allocation management circuit 206 may indicate that a corresponding thread has an active execution state. The indication of the execution state of the thread may be changed as a result of various events (e.g., a deallocation request from a corresponding data master, a particular amount of time passing, or another event).

Figure 4:
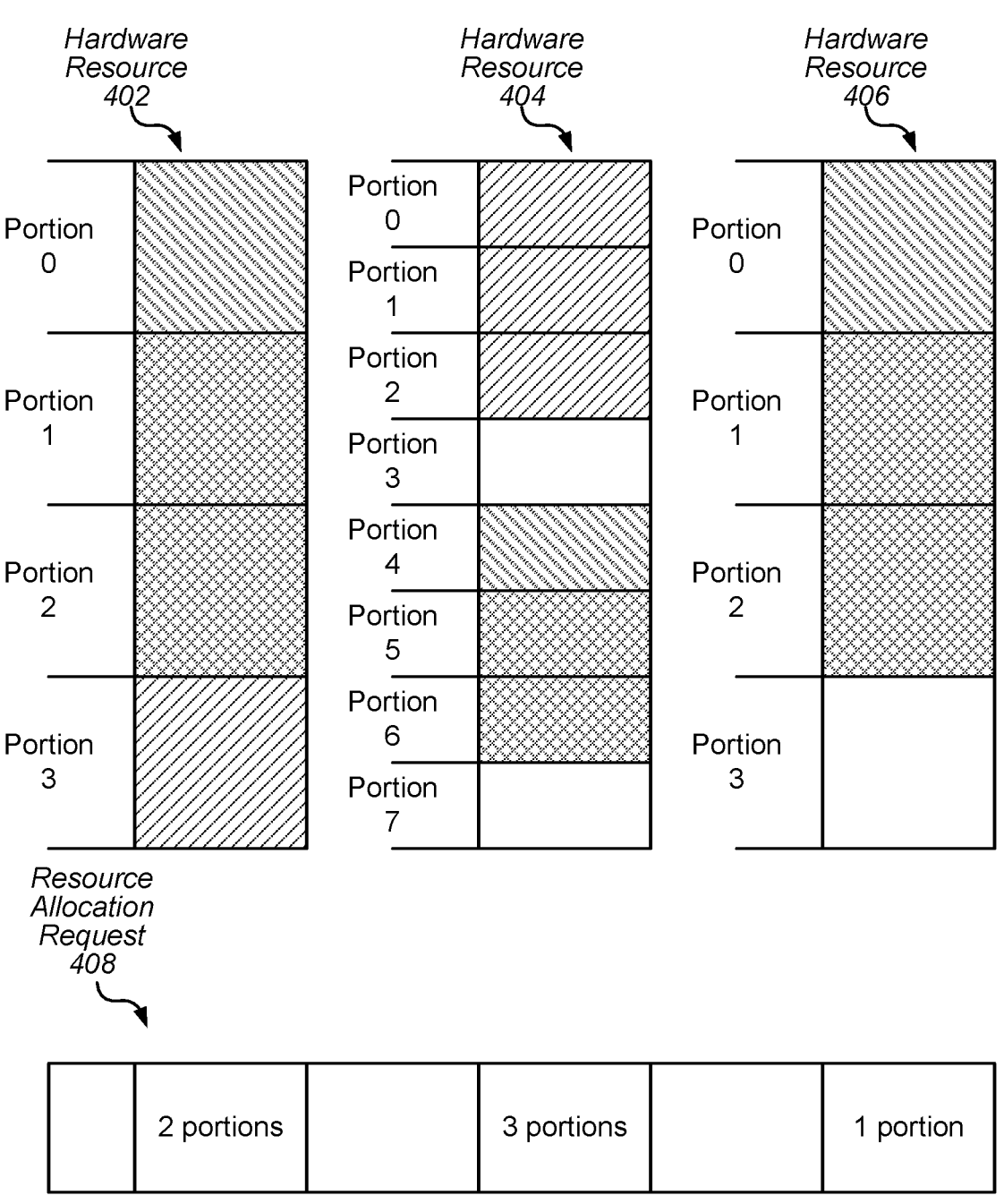
FIG. 4 is a block diagram illustrating an example hardware resource allocation process.

As discussed further with regard to FIG. 4, in response to resource allocation request 210, resource allocation management circuit 206 may determine, via resource allocation information request 214 and resource allocation information response 216, whether a requested amount of hardware resources are available. In response to determining that the respective requested amounts of each type of hardware resources are available, resource allocation management circuit 206 may send allocation request(s) 218 to resource allocation circuits 208 corresponding to the respective requested hardware resources. In response to receiving allocation response(s) 220 from the resource allocation circuits 208, resource allocation management circuit 206 may indicate, via resource allocation response 212 to the corresponding data master (e.g., data master 202b) that the resources have been allocated. In some embodiments, resource allocation response 212 may include one or more addresses corresponding to the allocated hardware resources. Further, based on resource allocation information response 216, resource allocation management circuit 206 may create a new entry at memory device 204 corresponding to the thread or may modify an existing entry corresponding to the thread. In some embodiments, memory device 204 may be updated, resource allocation response 212 may be sent, or both, prior to resource allocation management circuit 206 receiving allocation response(s) 220.

In some cases, data masters 202a-n may request more of one or more types of hardware resources than are currently available. Resource allocation management circuit 206 may deallocate resources from one or more threads to fulfill current resource allocation requests. The thread(s) may be identified using various arbitration factors including at least one of a data master corresponding to the current resource allocation request, whether the threads have an inactive execution state, a least recently active (least recently used) thread, amounts of resources allocated to the threads, a least recently allocated thread a replacement scheme corresponding to the data master corresponding to the current resource allocation request, other arbitration factors, or a combination thereof. For example, for some data masters (e.g., data master 202a) resource allocation management circuit 206 may select other thread(s) corresponding to data master 202a for deallocation. As another example, for some data masters (e.g., data master 202b), resource allocation management circuit 206 may select thread(s) corresponding to other data masters (e.g., data master 202a) for deallocation. In some embodiments, data masters 202a-n may have corresponding priority levels. As described further with respect to FIG. 4, in some embodiments, thread(s) may be selected for deallocation such that a number of threads that are deallocated is reduced, as compared to other arbitration schemes. As a result, a reduced amount of bandwidth may be consumed by restoring data when the deallocated threads are reallocated, as compared to arbitration schemes where more threads are deallocated. Resource allocation management circuit 206 may deallocate the hardware resources by sending deallocation request 222 to the corresponding resource allocation circuit(s) (e.g., resource allocation circuits 208a and 208n). In response to deallocation response(s) 224, resource allocation management circuit 206 may request modification or deletion of one or more entries of memory device 204 corresponding to the deallocated thread(s). In some embodiments, memory device 204 may be updated prior to resource allocation management circuit 206 receiving deallocation response(s) 224. Subsequent to deallocating at least the requested number of hardware resources for the current resource allocation request (e.g., resource allocation request 210), resource allocation management circuit 206 may allocate the resources to the corresponding thread as discussed above.

Memory device 204 may store, using thread allocation map 205, indications of how the hardware resources corresponding to resource allocation circuits 208a-n are allocated to the threads. For example, thread allocation map 205 may include indications of numbers of each type of hardware resource allocated to a particular thread. The threads may be identified using respective state identification values. In some embodiments, thread allocation map 205 may further include at least one of indications of data masters corresponding to the threads, execution states of the threads (e.g., inactive or active), or other information regarding the threads, data masters, or both. As discussed above, in response to resource allocation information request 214 identifying a particular thread, memory device 204 may send, to resource allocation management circuit 206 via resource allocation information response 216, corresponding information regarding the particular thread.

As discussed further below with respect to FIG. 3, resource allocation circuits 208a-n may allocate respective hardware resources to various threads. In the illustrated embodiment, each resource allocation circuit 208a-n corresponds to a respective different type of hardware resources (e.g., texture state register circuits, uniform register circuits, or sampler state register circuits). However, in other embodiments, one or more of resource allocation circuits 208a-n (e.g., resource allocation circuit 208b) may correspond to multiple types of hardware resources.

In some embodiments, hardware resource allocation system 200 may deallocate all hardware resources allocated to one or more data masters. For example, hardware resource allocation system 200 may deallocate all hardware resources allocated to data master 202a in response to an indication that data master 202a is changing a context. The deallocation may be a flash deallocation where deallocation requests are sent to one or more of resource allocation circuits 208a-n (e.g., to all resource allocation circuits 208a-n or only to resource allocation circuits that have allocated resources corresponding to data master 202a). In some embodiments, a tag indicating a context of a corresponding data master may be included in thread allocation map 205.

Figure 3:
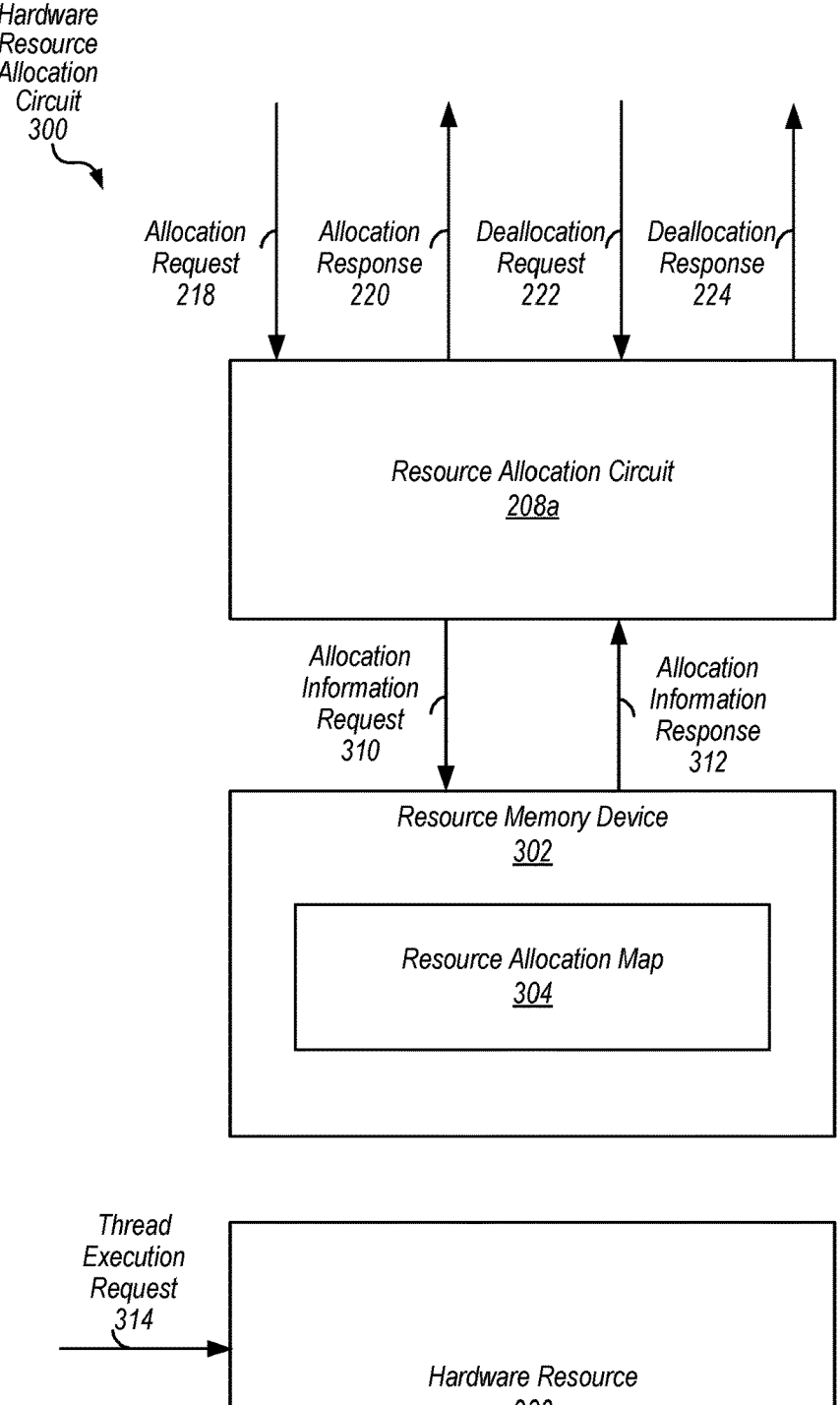
FIG. 3 is a block diagram illustrating one embodiment of a hardware resource allocation circuit of a hardware resource allocation system.

Turning now to FIG. 3, a simplified block diagram illustrating one embodiment of a hardware resource allocation circuit 300 is shown. In the illustrated embodiment, hardware resource allocation circuit 300 includes resource allocation circuit 208a, resource memory device 302, and hardware resource 306. Resource memory device 302 includes resource allocation map 304. In the illustrated embodiment, only a single hardware resource (hardware resource 306) is included. However, in other embodiments, hardware resource allocation circuit 300 may include multiple hardware resources. In embodiments where hardware resource allocation circuit 300 includes multiple hardware resources, resource allocation map 304 may correspond to the multiple hardware resources, resource memory device 302 may include multiple resource allocation maps, each corresponding to one or more of the multiple hardware resources, or hardware resource allocation circuit 300 may include multiple resource memory devices, each corresponding to one or more of the multiple hardware resources.

As described above with respect to FIG. 2, resource allocation circuit 208*a* may, in response to allocation request 218 from resource allocation management circuit 206, allocate one or more portions of hardware resource 306 to a thread. In response to allocation request 218, resource allocation circuit 208*a* may send allocation information request 310 to resource memory device 302. Allocation information request 310 may request allocation information for hardware resource 306, where the allocation information corresponds to the thread. In some embodiments, allocation request 218 and allocation information request 310 may include the state identification value of the thread. Resource allocation circuit 208*a* may receive the requested information from resource memory device 302 via allocation information response 312. In response to receiving allocation information response 312, resource allocation circuit 208*a* may indicate, via allocation response 220, that the resources have been allocated. In some embodiments, allocation response 220 may include an address corresponding to the allocated hardware resources. Further, based on allocation information response 312, resource allocation circuit 208*a* may request that resource memory device 302 create a new entry corresponding to the thread or may request that resource memory device 302 modify an existing entry corresponding to the thread.

Similarly, in response to deallocation request 222, resource allocation circuit 208*a* may request modification or deletion of one or more entries of resource memory device 302 corresponding to the deallocated thread(s). In some embodiments, deallocation request 222 may include state identification value of the deallocated thread(s). In response to receiving an indication that the one or more entries have been deallocated, resource allocation circuit 208*a* may send deallocation response 224 to resource allocation management circuit 206.

Resource memory device 302 may store, using resource allocation map 304, indications of how hardware resource 306 is allocated to the threads. For example, resource allocation map 304 may include indications of a number of portions of hardware resource 306 allocated to a particular thread. The threads may be identified using respective state identification values. As discussed above, in response to allocation information request 310 identifying a particular thread, resource memory device 302 may send, to resource allocation circuit 208*a* via allocation information response 312, corresponding information regarding the particular thread.

Hardware resource 306 may receive requests from threads (e.g., thread execution request 314) and may generate data, retrieve data, perform an operation on data, or perform another computing action. In some cases, in response to thread execution request 314, hardware resource 306 may generate thread execution response 316. As discussed below with reference to FIG. 4, in some embodiments, hardware resource 306 may be partitioned into several portions and allocated to multiple threads simultaneously. Alternatively, hardware resource 306 may be allocated to multiple threads simultaneously and may be scheduled (e.g., execution unit scheduling and sharing) based on the allocation. As discussed above, hardware resource 306 may be one of multiple types of hardware resources in hardware resource allocation system 200 of FIG. 2. For example, hardware resource 306 may correspond to a memory device (e.g., a uniform memory device, a compute memory device, or a texture memory device), an execution unit, or another type of hardware resource shared between the threads of data masters 202*a-n* of FIG. 2.

Turning now to FIG. 4, a simplified block diagram illustrating an example hardware resource allocation process is shown. In the illustrated example, hardware resources 402-406 are shown. Additionally, resource allocation request 408 is shown. In the illustrated embodiment, portions of hardware resources 402-406 have been allocated to three threads, as indicated by different hatch patterns. The empty portions may correspond to hardware resources that have not been allocated. In the illustrated embodiment, each pattern of hatching corresponds to a different thread and resource allocation request 408 corresponds to a fourth thread. Additionally, for simplicity, in the illustrated example, portions of hardware resources 402-406 may only be allocated contiguously. In various embodiments, one of hardware resources 402-406 may correspond to hardware resource 306 of FIG. 3. Further, resource allocation request 408 may correspond to resource allocation request 210 of FIG. 2.

In the illustrated embodiment, resource allocation request 408 requests more portions of hardware resources 402 and 404 than are currently available. As discussed above, the hardware resources may be deallocated using various arbitration methods. However, the resources allocated to each thread may be considered as a whole, as opposed to considering each resource individually. For example, the thread corresponding to portion 1 of hardware resource 402 may be deallocated, thus freeing up the requested portions of hardware resources 402 and 404. By contrast, for example, a hardware resource allocation system that does not consider allocations as a whole may free portions 1 and 2 from hardware resource 402 and may free portions 0-2 from hardware resource 404, deallocating resources allocated to multiple threads. In the illustrated example, to complete execution, the deallocated threads would both subsequently request allocation of the deallocated resources, consuming more memory bandwidth, as compared to the example discussed above.

Referring now to FIG. 5, a flow diagram of a method 500 of allocating hardware resources using a hardware resource allocation system is depicted. In some embodiments, method 500 may be initiated or performed by one or more processors in response to one or more instructions stored by a computer-readable storage medium.

At 502, method 500 includes receiving a request to allocate, for a first thread, respective particular numbers of different types of hardware resources. For example, resource allocation request 408 of FIG. 4 may request three portions of hardware resource 402, three portions of hardware resource 404, and one portion of hardware resource 406.

At 504, method 500 includes determining that fewer than a requested number of one or more types of hardware resources are available. For example, resource allocation management circuit 206 may determine (e.g., via resource allocation information request 214) that fewer than a requested number of hardware resources at hardware resource 402 are available.

At 506, method 500 includes identifying a second thread for deallocation. For example, resource allocation management circuit 206 may identify the thread corresponding to portion 1 of hardware resource 402 for deallocation.

At 508, method 500 includes sending deallocation requests to one or more of a plurality of hardware resource management circuits. The deallocation requests include a state identification value of the second thread. For example, resource allocation management circuit may send deallocation requests 222 to hardware resource management circuits 208*a-n* (e.g., corresponding to the hardware resources allocated to the second thread), where hardware resource management circuits correspond to hardware resources 402-406, respectively.

At 510, method 500 includes sending allocation requests to one or more of the plurality of hardware resource management circuits. The allocation requests include a state identification value of the first thread and a respective number of requested hardware resources. For example, resource allocation management circuit 206 may send allocation requests 218 to resource allocation circuits 208*a-n* (e.g., corresponding to the hardware resources requested by the first thread).

At 512, method 500 includes indicating that execution of the first thread has been approved. For example, resource allocation management circuit may send resource allocation response 212 to a corresponding data master (e.g., data master 202*b*). Accordingly, a method of allocating hardware resources using a hardware resource allocation system is depicted.

Figure 6:
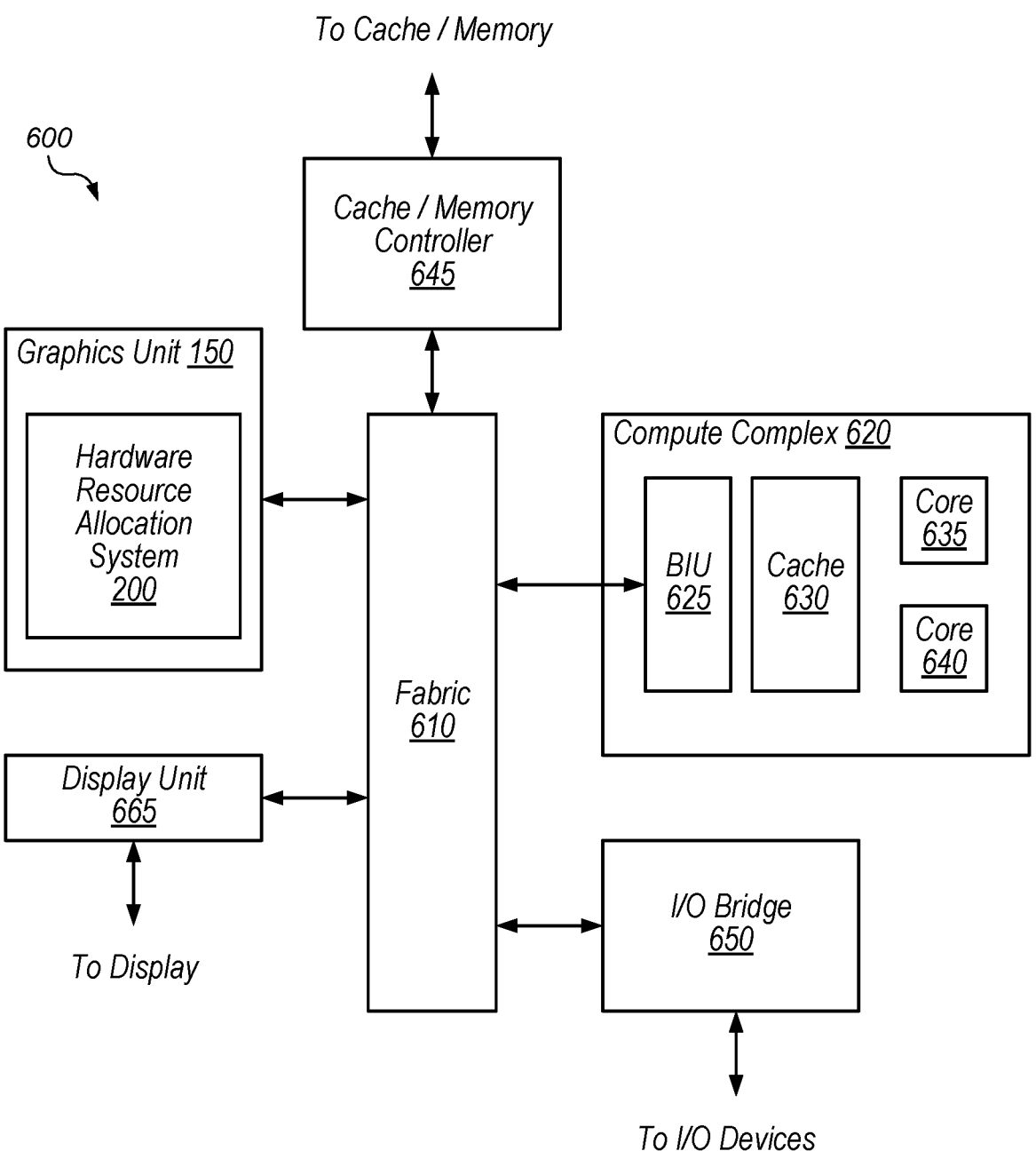
FIG. 6 is block diagram illustrating an embodiment of a computing system that includes at least a portion of a hardware resource allocation system.

Turning next to FIG. 6, a block diagram illustrating an exemplary embodiment of a computing system 600 that includes at least a portion of a hardware resource allocation system. The computing system 600 includes graphics unit 150 of FIG. 1. In some embodiments, graphics unit 150 includes one or more of the circuits described above with reference to FIG. 1, including any variations or modifications described previously with reference to FIGS. 1-5. Additionally, the computing system 600 includes hardware resource allocation system 200 of FIG. 2. In some embodiments, hardware resource allocation system 200 includes one or more of the circuits described above with reference to FIGS. 2-5, including any variations or modifications described previously with reference to FIGS. 2-5. In some embodiments, some or all elements of the computing system 600 may be included within a system on a chip (SoC). In some embodiments, computing system 600 is included in a mobile device. Accordingly, in at least some embodiments, area and power consumption of the computing system 600 may be important design considerations. In the illustrated embodiment, the computing system 600 includes fabric 610, graphics unit 150, compute complex 620, input/output (I/O) bridge 650, cache/memory controller 645, and display unit 665. Although the computing system 600 illustrates graphics unit 150 as being connected to fabric 610 as a separate device of computing system 600, in other embodiments, graphics unit 150 may be connected to or included in other components of the computing system 600. Additionally, the computing system 600 may include multiple graphics units 150. The multiple graphics units 150 may correspond to different embodiments or to the same embodiment. Further, although in the illustrated embodiment, hardware resource allocation system 200 is part of graphics unit 150, in other embodiments, hardware resource allocation system 200 may be a separate device or may be included in other components of computing system 600.

Fabric 610 may include various interconnects, buses, MUXes, controllers, etc., and may be configured to facilitate communication between various elements of computing system 600. In some embodiments, portions of fabric 610 are configured to implement various different communication protocols. In other embodiments, fabric 610 implements a single communication protocol and elements coupled to fabric 610 may convert from the single communication protocol to other communication protocols internally.

In the illustrated embodiment, compute complex 620 includes bus interface unit (BIU) 625, cache 630, and cores 635 and 640. In some embodiments, cache 630, cores 635 and 640, other portions of compute complex 620, or a combination thereof may be hardware resources. In various embodiments, compute complex 620 includes various numbers of cores and/or caches. For example, compute complex 620 may include 1, 2, or 4 processor cores, or any other suitable number. In some embodiments, cores 635 and/or 640 include internal instruction and/or data caches. In some embodiments, a coherency unit (not shown) in fabric 610, cache 630, or elsewhere in computing system 600 is configured to maintain coherency between various caches of computing system 600. BIU 625 may be configured to manage communication between compute complex 620 and other elements of computing system 600. Processor cores such as cores 635 and 640 may be configured to execute instructions of a particular instruction set architecture (ISA), which may include operating system instructions and user application instructions.

Cache/memory controller 645 may be configured to manage transfer of data between fabric 610 and one or more caches and/or memories (e.g., non-transitory computer readable mediums). For example, cache/memory controller 645 may be coupled to an L3 cache, which may, in turn, be coupled to a system memory. In other embodiments, cache/memory controller 645 is directly coupled to a memory. In some embodiments, the cache/memory controller 645 includes one or more internal caches. In some embodiments, the cache/memory controller 645 may include or be coupled to one or more caches and/or memories that include instructions that, when executed by one or more processors (e.g., compute complex 620 and/or graphics unit 150), cause the processor, processors, or cores to initiate or perform some or all of the processes described above with reference to FIGS. 1-5 or below with reference to FIG. 7. In some embodiments, one or more portions of the caches/memories may correspond to hardware resources.

As used herein, the term "coupled to" may indicate one or more connections between elements, and a coupling may include intervening elements. For example, in FIG. 6, display unit 665 may be described as "coupled to" compute complex 620 through fabric 610. In contrast, in the illustrated embodiment of FIG. 6, display unit 665 is "directly coupled" to fabric 610 because there are no intervening elements.

Graphics unit 150 may include one or more processors and/or one or more graphics processing units (GPU's). Graphics unit 150 may receive graphics-oriented instructions, such as OPENGL®, Metal, or DIRECT3D® instructions, for example. Graphics unit 150 may execute specialized GPU instructions or perform other operations based on the received graphics-oriented instructions. Graphics unit 150 may generally be configured to process large blocks of data in parallel and may build images in a frame buffer for output to a display. Graphics unit 150 may include transform, lighting, triangle, and/or rendering engines in one or more graphics processing pipelines. Graphics unit 150 may output pixel information for display images. In the illustrated embodiment, graphics unit 150 includes programmable shader 160.

Display unit 665 may be configured to read data from a frame buffer and provide a stream of pixel values for display.

Display unit 665 may be configured as a display pipeline in some embodiments. Additionally, display unit 665 may be configured to blend multiple frames to produce an output frame. Further, display unit 665 may include one or more interfaces (e.g., MIPI® or embedded display port (eDP)) for coupling to a user display (e.g., a touchscreen or an external display). In some embodiments, one or more portions of display unit 665 may be hardware resources.

I/O bridge 650 may include various elements configured to implement: universal serial bus (USB) communications, security, audio, and/or low-power always-on functionality, for example. I/O bridge 650 may also include interfaces such as pulse-width modulation (PWM), general-purpose input/output (GPIO), serial peripheral interface (SPI), and/or inter-integrated circuit (I2C), for example. Various types of peripherals and devices may be coupled to computing system 600 via I/O bridge 650. In some embodiments, graphics unit 150 may be coupled to computing system 600 via I/O bridge 650. In some embodiments, one or more devices coupled to I/O bridge 650 may be hardware resources.

Figure 7:
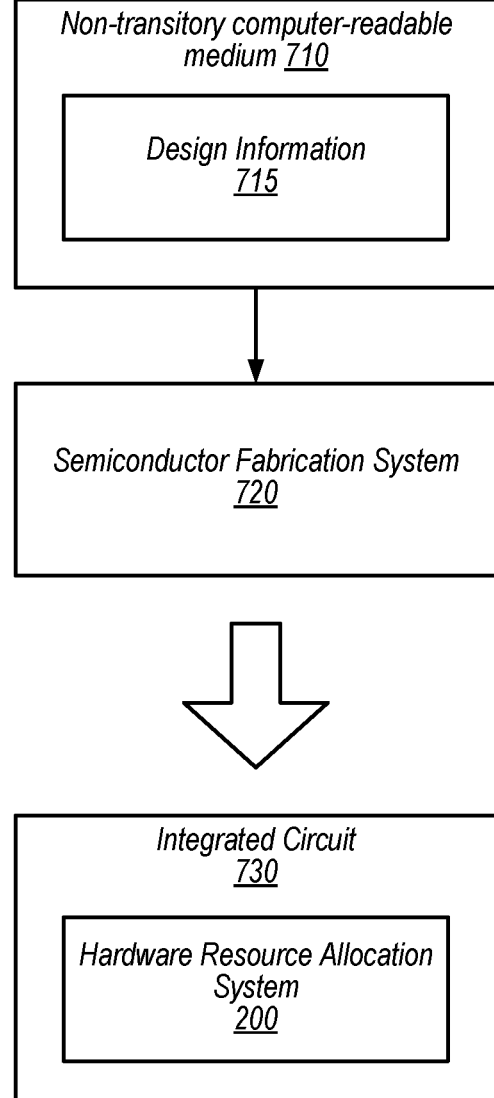
FIG. 7 is a block diagram illustrating one embodiment of a process of fabricating at least a portion of a processing circuit that includes a hardware resource allocation system.

FIG. 7 is a block diagram illustrating a process of fabricating at least a portion of a branch prediction redirection system. FIG. 7 includes a non-transitory computer-readable medium 710 and a semiconductor fabrication system 720. Non-transitory computer-readable medium 710 includes design information 715. FIG. 7 also illustrates a resulting fabricated integrated circuit 730. In the illustrated embodiment, integrated circuit 730 includes hardware resource allocation system 200 of FIG. 2. However, in other embodiments, integrated circuit 730 may only include one or more portions of hardware resource allocation system 200 (e.g., resource allocation management circuit 206). In the illustrated embodiment, semiconductor fabrication system 720 is configured to process design information 715 stored on non-transitory computer-readable medium 710 and fabricate integrated circuit 730.

Non-transitory computer-readable medium 710 may include any of various appropriate types of memory devices or storage devices. For example, non-transitory computer-readable medium 710 may include at least one of an installation medium (e.g., a CD-ROM, floppy disks, or tape device), a computer system memory or random access memory (e.g., DRAM, DDR RAM, SRAM, EDO RAM, Rambus RAM, etc.), a non-volatile memory such as a Flash, magnetic media (e.g., a hard drive, or optical storage), registers, or other types of non-transitory memory. Non-transitory computer-readable medium 710 may include two or more memory mediums, which may reside in different locations (e.g., in different computer systems that are connected over a network).

Design information 715 may be specified using any of various appropriate computer languages, including hardware description languages such as, without limitation: VHDL, Verilog, SystemC, System Verilog, RHDL, M, MyHDL, etc. Design information 715 may be usable by semiconductor fabrication system 720 to fabricate at least a portion of integrated circuit 730. The format of design information 715 may be recognized by at least one semiconductor fabrication system 720. In some embodiments, design information 715 may also include one or more cell libraries, which specify the synthesis and/or layout of integrated circuit 730. In some embodiments, the design information is specified in whole or in part in the form of a netlist that specifies cell library elements and their connectivity. Design information 715, taken alone, may or may not include sufficient information for fabrication of a corresponding integrated circuit (e.g., integrated circuit 730). For example, design information 715 may specify circuit elements to be fabricated but not their physical layout. In this case, design information 715 may be combined with layout information to fabricate the specified integrated circuit.

Semiconductor fabrication system 720 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 720 may also be configured to perform various testing of fabricated circuits for correct operation.

In various embodiments, integrated circuit 730 is configured to operate according to a circuit design specified by design information 715, which may include performing any of the functionality described herein. For example, integrated circuit 730 may include any of various elements described with reference to FIGS. 1-6. Further, integrated circuit 730 may be configured to perform various functions described herein in conjunction with other components. The functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

In some embodiments, a method of initiating fabrication of integrated circuit 730 is performed. Design information 715 may be generated using one or more computer systems and stored in non-transitory computer-readable medium 710. The method may conclude when design information 715 is sent to semiconductor fabrication system 720 or prior to design information 715 being sent to semiconductor fabrication system 720. Accordingly, in some embodiments, the method may not include actions performed by semiconductor fabrication system 720. Design information 715 may be sent to fabrication system 720 in a variety of ways. For example, design information 715 may be transmitted (e.g., via a transmission medium such as the Internet) from non-transitory computer-readable medium 710 to semiconductor fabrication system 720 (e.g., directly or indirectly). As another example, non-transitory computer-readable medium 710 may be sent to semiconductor fabrication system 720. In response to the method of initiating fabrication, semiconductor fabrication system 720 may fabricate integrated circuit 730 as discussed above.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
a plurality of hardware resource allocation circuits configured to collectively allocate different types of hardware resources to threads;
a memory device configured to store a thread allocation map that indicates amounts of the different types of hardware resources allocated to a given thread of the threads;
a resource allocation management circuit coupled to the memory device and configured to:
receive one or more resource allocation requests to allocate specified amounts of the different types of hardware resources to a first thread to utilize when executed;
identify, based on the thread allocation map, a second thread for deallocation that has been allocated hardware resources from multiple of the different types of hardware resources;
send deallocation requests to the plurality of hardware resource allocation circuits to deallocate a set of hardware resources allocated to the second thread;
send allocation requests to the plurality of hardware resource allocation circuits to allocate, using at least a portion of the set of deallocated hardware resources, the specified amounts of the different types of hardware resources to the first thread; and
update the thread allocation map to indicate an allocation of the specified amounts of the different types of hardware resources to the first thread,
wherein a particular one of the plurality of hardware resource allocation circuits is configured to:
receive an allocation request of the allocation requests from the resource allocation management circuit;
update a resource allocation map managed by the particular hardware resource allocation circuit to allocate, to the first thread, a number of portions of a hardware resource managed by the particular hardware resource allocation circuit; and
return an allocation response to the resource allocation management circuit; and
wherein the apparatus further comprises a first pipeline circuit configured to execute the first thread to utilize the allocated specified amounts of the different types of hardware resources.

2. The apparatus of claim 1, wherein the resource allocation management circuit is configured to identify the second thread based on an indication in the thread allocation map that the second thread is associated with an inactive state.

3. The apparatus of claim 1, further comprising:
a first data master that corresponds to the first pipeline circuit and is configured to manage the first thread; and
a second data master that corresponds to a second pipeline circuit and is configured to manage the second thread.

4. The apparatus of claim 3, wherein the resource allocation management circuit is configured to identify the second thread based on an indication in the thread allocation map that the second thread is associated with a different data master than the first thread.

5. The apparatus of claim 3, wherein the resource allocation management circuit is configured to identify the second thread based on a replacement scheme that corresponds to the second data master.

6. The apparatus of claim 3, wherein the resource allocation management circuit is configured to reserve amounts of the different types of hardware resources for the first data master such that the reserved amounts are not available for servicing resource allocation requests from the second data master.

7. The apparatus of claim 3, wherein the resource allocation management circuit is configured to prioritize resource allocation requests from the first data master over the second data master.

8. The apparatus of claim 1, wherein the resource allocation management circuit is configured to return, to a requestor of the one or more resource allocation requests, a state identification value of the first thread that is usable to access information about the first thread that is stored in the thread allocation map.

9. The apparatus of claim 1, wherein the resource allocation management circuit is configured to delete an entry of the thread allocation map that corresponds to the second thread.

10. A method, comprising:
maintaining, by a resource allocation management circuit of a processor, a set of thread allocation maps that indicate amounts of different types of hardware resources allocated to a thread;
receiving, by the resource allocation management circuit, one or more resource allocation requests to allocate specified amounts of the different types of hardware resources to a first thread to utilize when executed;
based on the maintained set of thread allocation maps, the resource allocation management circuit identifying a second thread for deallocation that has been allocated hardware resources corresponding to at least one of the different types of hardware resources;
sending, by the resource allocation management circuit, deallocation requests to deallocate a set of hardware resources corresponding to the at least one different type of hardware resource that are allocated to the second thread;
sending, by the resource allocation management circuit, allocation requests to allocate, using at least a portion of the set of deallocated hardware resources, the specified amounts of the different types of hardware resources to the first thread, wherein at least one of the allocation requests is sent to a hardware resource allocation circuit that is configured to:
update a resource allocation map managed by the hardware resource allocation circuit to allocate, to the first thread, a number of portions of a hardware resource managed by the hardware resource allocation circuit; and
return an allocation response to the resource allocation management circuit;
updating, by the resource allocation management circuit, the set of thread allocation maps to indicate an allocation of the specified amounts of the different types of hardware resources to the first thread; and
executing, by a pipeline circuit of the processor, the first thread to utilize the allocated specified amounts of the different types of hardware resources.

11. The method of claim 10, wherein the set of thread allocation maps includes at least two thread allocation maps that each correspond to a respective one of the different types of hardware resources.

12. The method of claim 10, wherein the set of thread allocation maps indicates an execution state of a thread, wherein the second thread is selected based on an indication that the second thread is in an inactive state.

13. The method of claim 10, further comprising:

generating, by the resource allocation management circuit, a state identification value that corresponds to the first thread, wherein information about the first thread that is stored in the set of thread allocation maps is accessible using the state identification value.

14. The method of claim 13, wherein the state identification value is included in the allocation requests sent to allocate the specified amounts of the different types of hardware resources.

15. A non-transitory computer readable storage medium having stored thereon design information that specifies a circuit design in a format recognized by a fabrication system that is configured to use the design information to fabricate a hardware integrated circuit that includes:

a plurality of hardware resource allocation circuits configured to collectively allocate different types of hardware resources to threads;

a memory device configured to store a thread allocation map that indicates amounts of the different types of hardware resource allocated to a given thread of the threads;

a resource allocation management circuit coupled to the memory device and configured to:

receive a resource allocation request to allocate a specified amount of a hardware resource of the different types of hardware resources to a first thread to utilize when executed;

identify, based on the thread allocation map, a second thread for deallocation that has been allocated an amount of the hardware resource;

send a deallocation request to a hardware resource allocation circuit of the plurality of hardware resource allocation circuits to deallocate the amount of the hardware resource that has been allocated to the second thread;

send an allocation request to the hardware resource allocation circuit to allocate the specified amount of the hardware resource to the first thread; and update the thread allocation map to indicate an allocation of the specified amount of the hardware resource to the first thread, wherein the hardware resource allocation circuit is configured to:

update a resource allocation map managed by the hardware resource allocation circuit to allocate, to the first thread, a number of portions of the hardware resource managed by the hardware resource allocation circuit; and return an allocation response to the resource allocation management circuit that the specified amount of the hardware resource has been allocated; and wherein the hardware integrated circuit further includes a pipeline circuit configured to execute the first thread to utilize the allocated specified amount of the hardware resource.

16. The non-transitory computer readable storage medium of claim 15, wherein the resource allocation management circuit is configured to identify the second thread based on an indication in the thread allocation map that the second thread is associated with a particular state.

17. The non-transitory computer readable storage medium of claim 15, wherein the resource allocation management circuit is configured to identify the second thread based on an indication in the thread allocation map that the second thread is associated with a different data master than the first thread.

18. The non-transitory computer readable storage medium of claim 15, wherein the hardware resource allocation circuit is configured to delete an entry of the resource allocation map that corresponds to the second thread.

19. The non-transitory computer readable storage medium of claim 15, wherein the resource allocation management circuit is configured to select the second thread in response to a determination that the second thread is a least recently used thread having an inactive execution state.

20. The non-transitory computer readable storage medium of claim 15, wherein the different types of hardware resources correspond to a uniform memory device, a compute memory device, and a texture memory device.

* * * * *